UNITED STATES PATENT OFFICE.

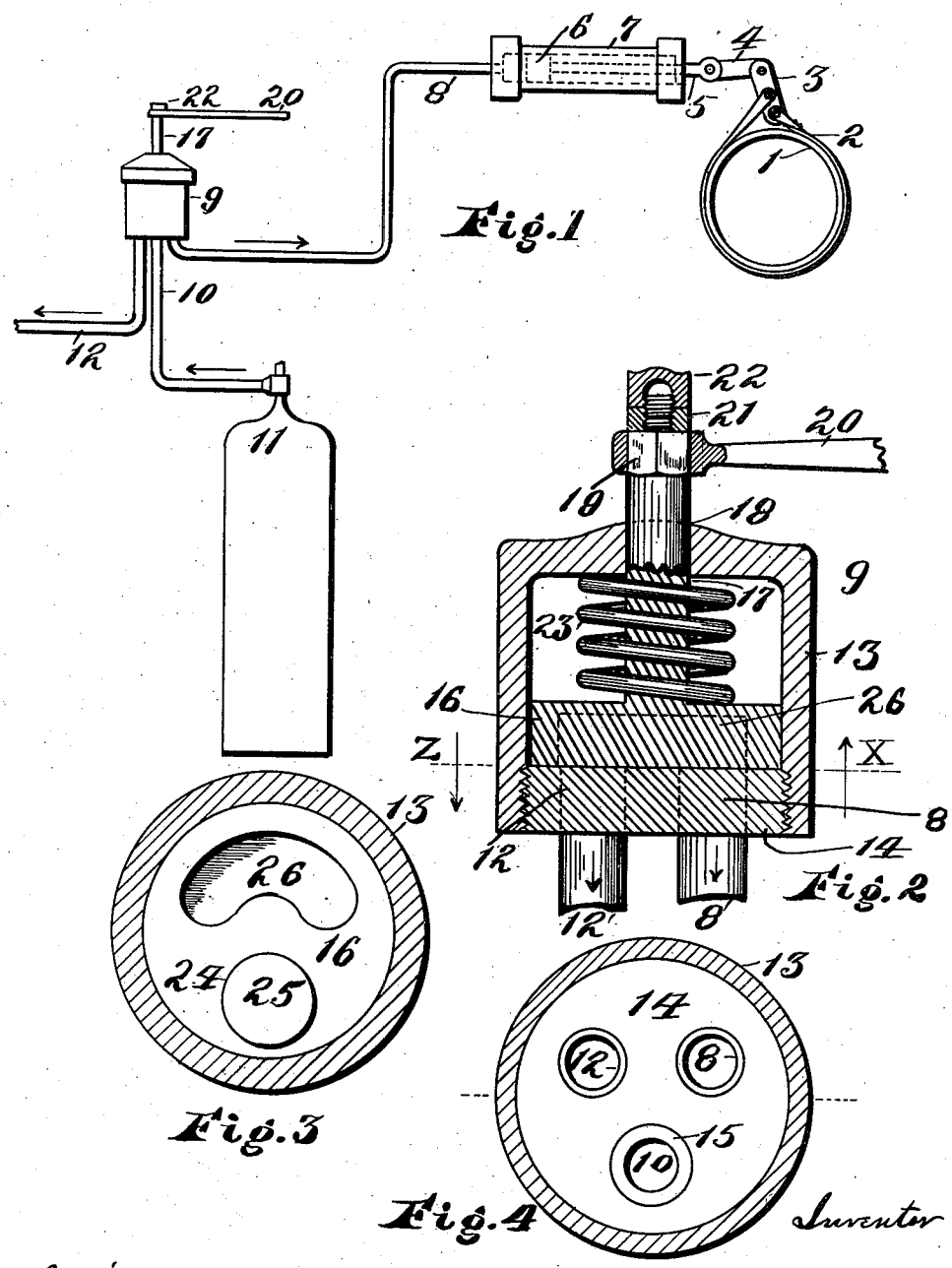

WILLIAM M. DAVIS, OF AKRON, OHIO.

VALVE.

1,136,589.

Specification of Letters Patent.

Patented Apr. 20, 1915.

Application filed November 21, 1912. Serial No. 732,689.

*To all whom it may concern:*

Be it known that I, WILLIAM M. DAVIS, a citizen of the United States, residing at Akron, in the county of Summit and State of Ohio, have invented new and useful Improvements in Valves, of which the following is a specification.

This invention relates to improvements in valves for controlling the operation of power brakes for wheels, and is especially adapted for use with the brakes for the wheels of self-propelled vehicles such as automobiles.

The primary object of the invention is to provide a safe and efficient valve for brakes for automobiles in which the brake will be operated through the medium of a fluid under pressure from a suitable source of supply and controlled through the instrumentality of the valve, the latter capable of controlling the flow of fluid to the brake-actuating mechanism and capable of releasing the same at the will of the operator.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings in which similar reference numerals indicate like parts in the different figures, Figure 1, is a diagrammatic view of a brake mechanism embodying this invention; Fig. 2, is a vertical central sectional view of a valve employed for controlling the flow of fluid used for operating the brake mechanism; Fig. 3, is a sectional view of the valve shown in Fig. 2 on line X thereof; and, Fig. 4, is a view similar to Fig. 3 on line Z thereof.

Referring to the drawings in detail, the reference numeral 1 denotes the brake flange of a wheel, (not shown), and around which is a brake band 2, the ends of which are connected to a lever 3 in such a manner that when the lever is shifted in one direction the band will be contracted on the flange 1 and when shifted in the opposite direction the diameter of the band 2 will be increased and the rotation of the wheel permitted.

Connected by means, such for instance, as a link 4 with the lever 3 is a piston-rod 5 bearing a piston 6 within a cylinder 7, to which a supply of fluid under pressure is conducted by an inlet pipe 8. The opposite end of the inlet pipe 8 is connected with a valve 9. Connecting with the valve 9 through the medium of a pipe 10 is a source of supply of fluid under pressure, such, for instance, as a reservoir or tank 11. The valve 9 is also provided with an outlet 12 connecting with the muffler or exhaust of the engine or it may discharge into the open air, as desired.

The foregoing description illustrates the general arrangement of the mechanism used for operating the brake.

The valve which I prefer to employ involves a cup-shaped casing 13 having the lower interior wall near the open end thereof provided with screw threads to receive an exteriorly threaded disk 14. The disk 14 is provided with three interiorly threaded apertures with which are connected the ends of pipes 8, 10 and 12. The upper face of the disk or closure member 14 is counterbored surrounding the opening for the pipe 10 and in this counterbore or recess is placed an elastic or resilient washer 15 for a purpose to be later described.

Rotatably mounted within the casing 13 and immediately above the disk or closure member 14, is a valve 16 consisting of a disk having a smooth lower face adapted to snugly fit against the upper face of the disk 14 and provided with a valve stem 17 projecting through a suitable orifice 18 in the upper end of the casing 13. Above the casing 13 the valve stem 17 is squared at 19 to receive an operating lever 20 above which is a clamping nut 21 held in position through the medium of a locking nut 22. Between the upper face of the valve 16 and the under face of the head of the casing 13 is a coiled resilient element 23 for constantly forcing the opposing faces of the members 14 and 16 into snug engagement. The under face of the valve 16 is provided with a recess 24 in which is placed a body 25 of resilient material such as rubber, for a purpose to be later described. The body of the valve 16 is further provided with a recess 26 preferably concentric with the axis of the valve and of such a length and formation as to be capable of simultaneously establishing communication between at least two of the termini of the pipes 8, 10 and 12.

In practice, a fluid under pressure passes from the tank or storage supply 11 through the pipe 10 to the valve. If the lever 20 is moved into one position the body of rubber 25 is positioned immediately over the end of the pipe 10 thereby closing the same and preventing the ingress of fluid into the valve casing. When the rubber closure member 25 is positioned over the end of the pipe 10 the recess 26 establishes communication between the termini of the pipes 8 and 12 thereby permitting any fluid contained in the cylinder 7 to escape. If the valve 16 is shifted into a position to bring the rubber closure member 25 over the end of the pipe 12 it brings the recess 26 into registration with the termini of the pipes 8 and 10, thereby permitting the fluid to pass from the source of supply to the cylinder 7 for operating the piston 6 to operate the brake. If the valve is shifted through the medium of the lever 20 to bring the closure member 25 over the termini of the pipe 8 to close it, the recess 26 establishes communication between the termini of the pipes 10 and 12 thereby permitting the fluid in the reservoir 11 to escape through the exhaust 12.

I claim—

A power-brake valve comprising a cup-shaped casing having its lower open end interiorly screw-threaded, a threaded disk having peripheral threads engaging the threads of the casing to secure the lower face of the disk flush with the lower end of the casing, said disk having a plurality of pipe-receiving openings one of which is counterbored, said disk serving as a valve seat, a rotary valve supported upon the disk and formed on its under face with a circular recess and also with a recess concentric with the axis of the valve and of a length to communicate simultaneously with two of said openings, a stem projecting centrally from said valve and extending through an opening in the end of said casing, an operating lever for said stem, a coil spring surrounding said stem and being confined between the end of the casing and the valve, a washer within the counterbore of said disk, and a rubber plug within the circular recess of said valve adapted to coöperate with the washer of the disk to close the opening surrounded by said washer.

In testimony whereof I have hereunto set my hand in presence of two subscribing witnesses.

WILLIAM M. DAVIS.

Witnesses:
C. E. HUMPHREY,
A. L. McCLINTOCK.